(No Model.) 2 Sheets—Sheet 1.

F. P. WILSON.
COMBINED COUCH AND DIVAN.

No. 534,734. Patented Feb. 26, 1895.

Witnesses:
Chas. E. Van Doren.
W. E. Grolen

Inventor:
Freeman P. Wilson,
By Paul O Hawley
his Att'ys.

(No Model.) 2 Sheets—Sheet 2.
F. P. WILSON.
COMBINED COUCH AND DIVAN.
No. 534,734. Patented Feb. 26, 1895.
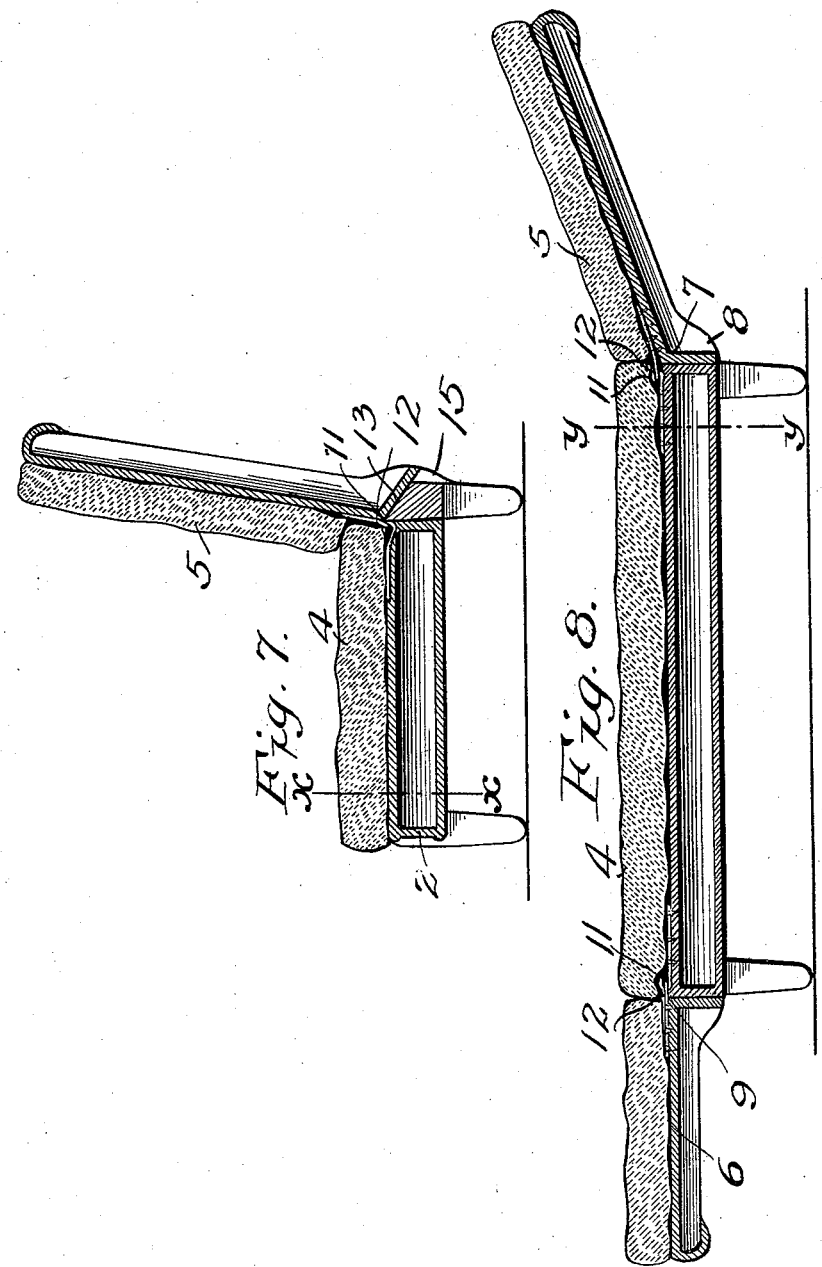
Witnesses:
Chas. E. Van Dolen
Richard Paul
Inventor:
Freeman P. Wilson.
By Paul & Hawley
his Attorneys.

UNITED STATES PATENT OFFICE.

FREEMAN P. WILSON, OF MINNEAPOLIS, MINNESOTA, ASSIGNOR OF ONE-HALF TO GEORGE W. SAWYER, OF SAME PLACE.

COMBINED COUCH AND DIVAN.

SPECIFICATION forming part of Letters Patent No. 534,734, dated February 26, 1895.

Application filed March 15, 1894. Serial No. 503,724. (No model.)

*To all whom it may concern:*

Be it known that I, FREEMAN P. WILSON, of the city of Minneapolis, county of Hennepin, State of Minnesota, have invented a certain new and Improved Combination Couch and Divan, of which the following is a specification.

My invention relates to a simple, cheap and compact piece of furniture, the normal shape being that of a divan, in which form it occupies a small space, and the other form being that of a long lounge or couch.

The object of my invention is to provide a short, neat divan having a back and which may be converted into a lounge.

The invention consists in general in the combination with a frame and seat portion, of two back portions removable from the rear edge of the frame and adapted to be placed upon opposite ends of the frame to lengthen the same and form a lounge; and the invention further consists in details of construction and in combination all as hereinafter described and particularly pointed out in the claims.

My invention will be more readily understood by reference to the accompanying drawings, forming part of this specification, and in which—

Figure 1:
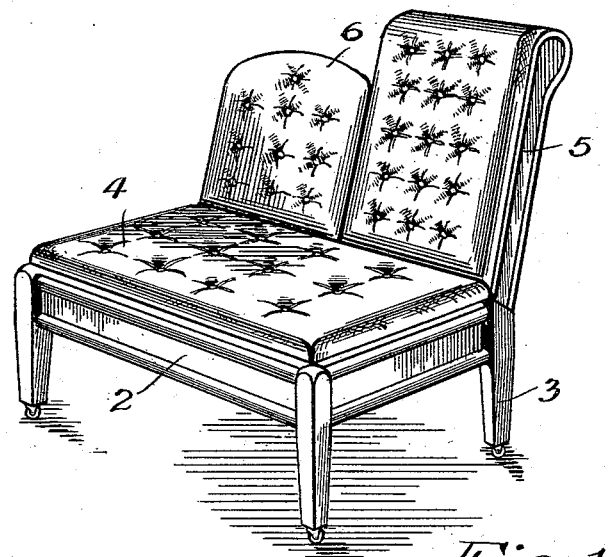
Figure 3:
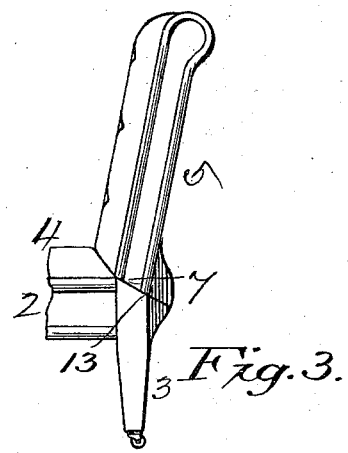
Figure 2:
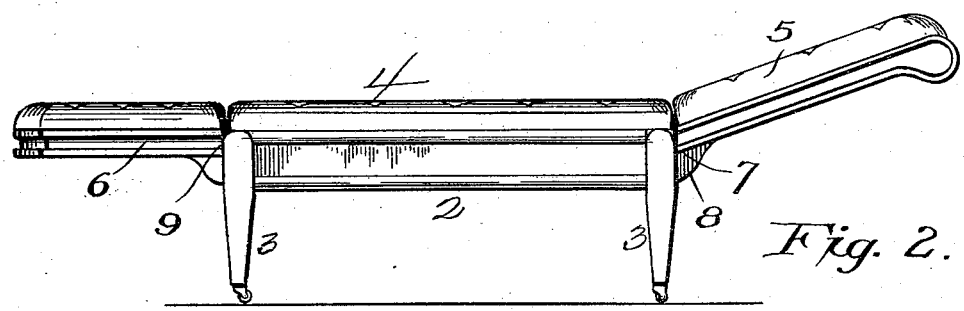
Figures 5, 6:
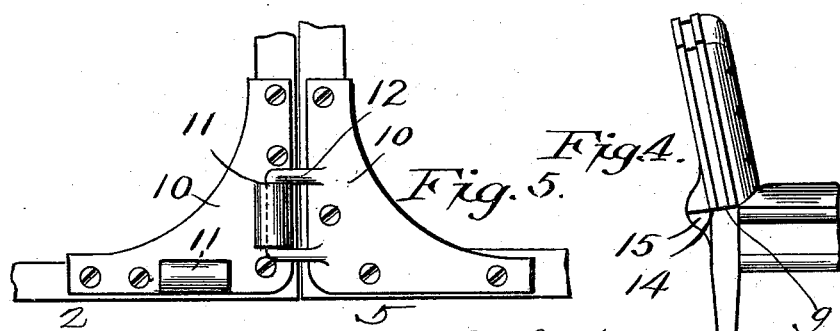
Figure 4:
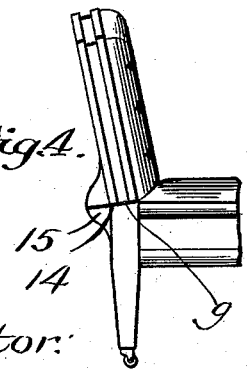

Figure 1 is a perspective view showing a convertible divan and couch embodying my invention. Fig. 2 is a front view thereof in the lounge form. Fig. 3 is a partial end view of the divan form. Fig. 4 is a similar view showing the opposite end. Fig. 5 is an enlarged plan detail showing the braces for the frame and the fastenings for the detachable parts. Fig. 6 is an end view thereof. Fig. 7 is a transverse section on the line y—y of Fig. 8, showing the detachable portions connected to the seat portion to form a divan. Fig. 8 is a longitudinal section on the line x—x of Fig. 7 showing the method of attaching the back portions to the ends of the seat portion to form a couch.

As shown in the drawings, my device is made up of a suitable frame 2, which may reach to the floor or may be provided with legs 3. The top of the frame is provided with the cushioned seat 4, and within the frame I preferably provide a receptacle for clothing or other articles. The back of the divan is made up of two independent parts 5 and 6, each consisting in a frame preferably upholstered, as shown, to correspond with the seat. These parts are made detachable from the rear edge and, as shown in Fig. 2, are adapted to be placed at the head and foot respectively, of the seat portion. The lower edge 7 of the head piece portion of the back is beveled and preferably provided with a bracket or brackets 8, so that when the head piece is placed in the position shown in Fig. 2, it will be held at an incline with respect to the seat portion. The other part 6 preferably has its lower edge 9 at right angles with the face of the frame, so that when attached to the foot of the divan the piece will extend out parallel with the top of the seat portion. These parts may be made of any shape or form desired and in any style, and the detachable fastenings may be of any suitable construction. I preferably employ, however, detachable fastenings of the construction shown in detail Figs. 5 and 6, and consisting in the knee or angle plates 10 placed at the corners of the frames and upon opposite sides provided respectively with the hooks 11 and the eyes or loops 12. The loops are preferably placed upon the parts 5 and 6 and may be readily forced in over the hooks. Similar fastenings may be provided midway of the frames if desired. In order that the two parts 5 and 6 may stand at similar inclinations upon the rear edge of the seat portion, the rear edge of the frame 2 is provided with two different bevels 13 and 14, as shown best in Figs. 3 and 4. The rear edge is preferably provided also with brackets 15 adapted to meet the brackets upon the detachable parts 5 and 6, and to strengthen the back frame thereby.

When in the divan form this piece of furniture will occupy a very small space or niche, while when it is desired to use the same as a lounge it may be drawn out into the room where there is more available space. Owing to this my combination divan and lounge may be used in many places where it would be impossible to conveniently place a full length lounge. Furthermore, owing to the simple construction of the device the cost thereof very slightly, if at all, exceeds that of a lounge of the same general pattern and quality.

Having thus described my invention, I claim as new and desire to secure by Letters Patent—

1. The combination, with the seat portion and its frame and supports, of the two back portions detachably secured to the rear edge of the frame of the seat portion and composed of independent frames, the lower edges of one of said frames being beveled and said detachable portions adapted to be secured upon opposite ends of the seat portion, and one of said parts adapted to be held at an incline with respect to the seat portion by the engagement of the bevel end thereof with the end of the seat frame, substantially as described.

2. The combination, with the seat portion and its frame and supports, of the two back portions detachably secured to the rear edge of the frame of the seat portion and composed of independent frames, the lower edges of one of said frames being beveled, and said detachable portions adapted to be secured upon opposite ends of the seat portion, and one of said parts adapted to be held at an incline with respect to the seat portion by the engagement of the bevel end thereof with the end of the seat frame, and the strengthening brackets provided upon the rear sides and lower edges of the detachable portions, as and for the purpose specified.

3. The combination, with the seat portion and its frame and supports, of the two back portions detachably secured to the rear edge of the frame of the seat portion and composed of independent frames, the lower edges of one of said frames being beveled, and said detachable portions adapted to be secured upon opposite ends of the seat portion, one of said parts adapted to be held at an incline with respect to the seat portion by the engagement of the bevel end thereof with the end of the seat frame, and the strengthening brackets provided upon the rear sides of the detachable portions, the rear edge of the seat frame being provided with the two bevel surfaces to receive the lower edges of the independent back portions, whereby, said parts are held at similar inclinations with respect to the seat portion, substantially as described.

4. The combination, with the seat portion and its frame and supports, of the two back portions detachably secured to the rear edge of the frame of the seat portion and composed of independent frames, the lower edges of one of said frames being beveled, and said detachable portions adapted to be secured upon opposite ends of the seat portion, one of said parts adapted to be held at an incline with respect to the seat portion by the engagement of the bevel end thereof with the end of the seat frame, the rear edge of the seat frame being provided with the two bevel surfaces to receive the lower edges of the independent back portions, whereby, said parts are held at similar inclinations with respect to the seat portion, substantially as described.

In testimony whereof I have hereunto set my hand this 12th day of March, A. D. 1894.

FREEMAN P. WILSON.

In presence of—
C. G. HAWLEY,
M. E. GOOLEY.